Sept. 29, 1936.  H. P. ANGERMUELLER  2,055,781
PROCESS AND APPARATUS FOR WASHING STEAM
Filed June 7, 1934  3 Sheets-Sheet 1
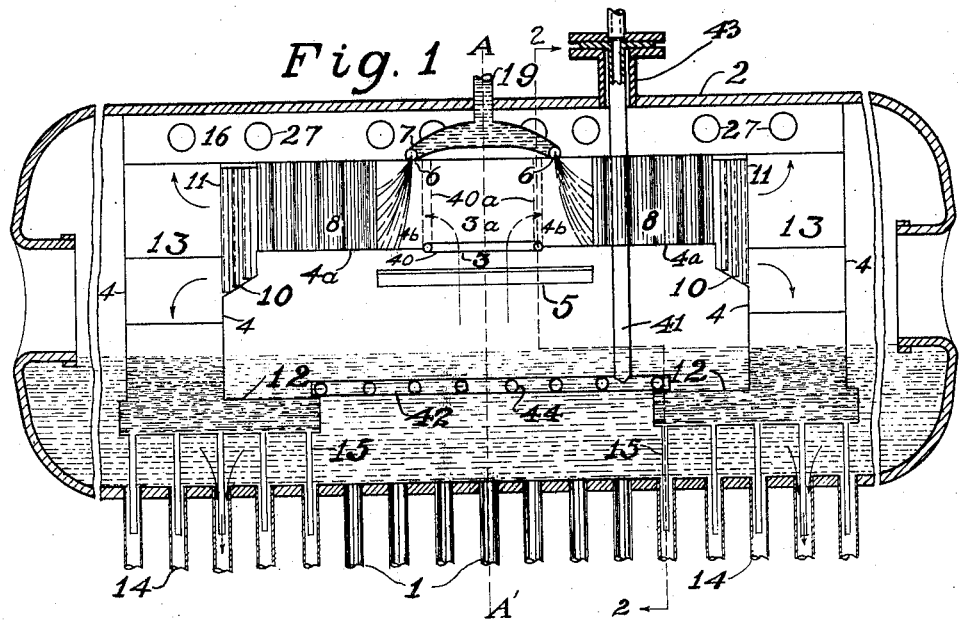
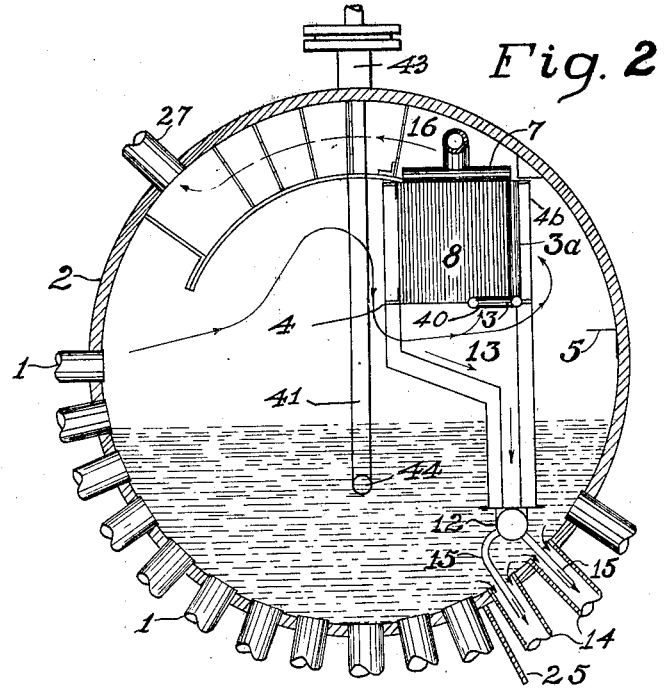
Herman P. Angermueller Inventor
By His Attorney Sept. 29, 1936.  H. P. ANGERMUELLER  2,055,781
PROCESS AND APPARATUS FOR WASHING STEAM
Filed June 7, 1934  3 Sheets-Sheet 2
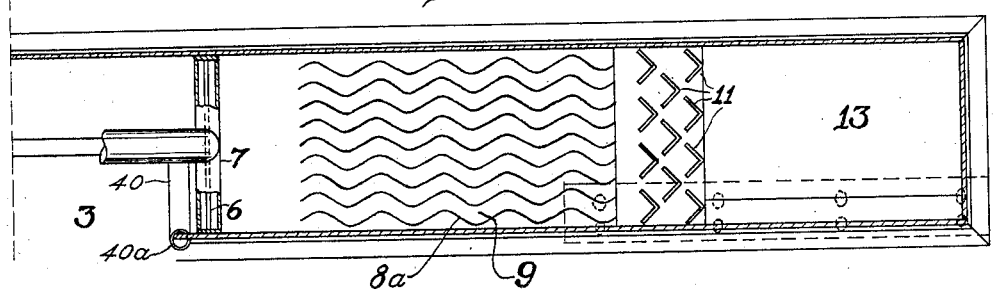
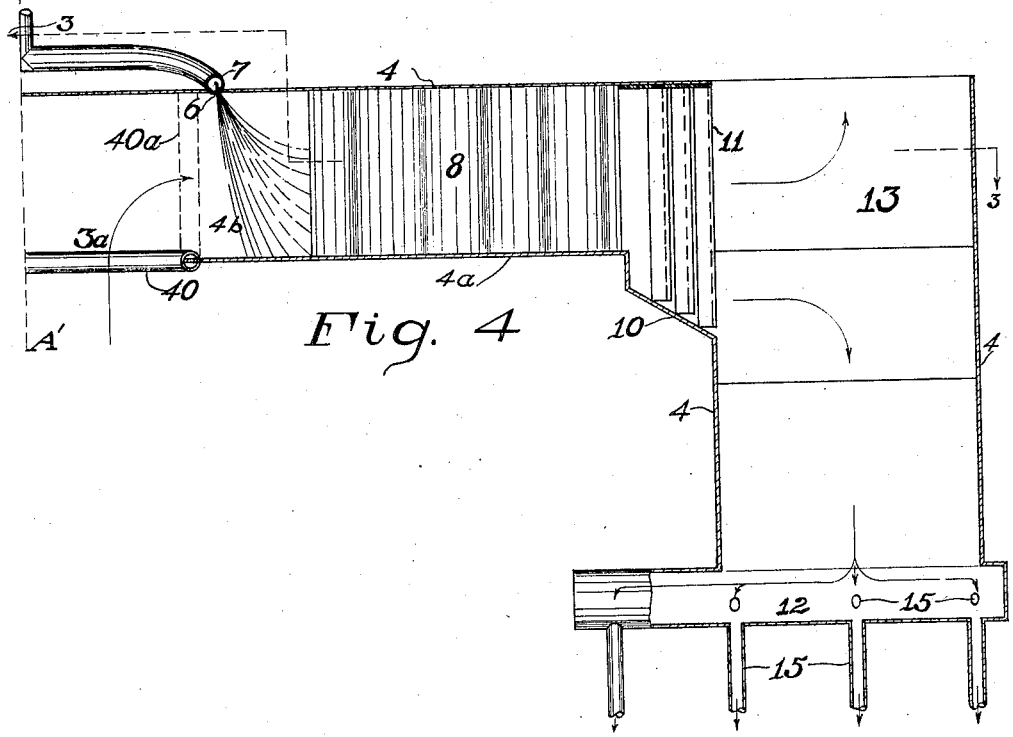
Herman P. Angermueller Inventor
By His Attorney Sept. 29, 1936.  H. P. ANGERMUELLER  2,055,781
PROCESS AND APPARATUS FOR WASHING STEAM
Filed June 7, 1934  3 Sheets-Sheet 3

Herman P. Angermueller INVENTOR
BY
ATTORNEY

Patented Sept. 29, 1936

2,055,781

UNITED STATES PATENT OFFICE 2,055,781

PROCESS AND APPARATUS FOR WASHING STEAM

Herman P. Angermueller, Cranford, N. J., assignor to General Aniline Works, Inc., New York, N. Y., a corporation of Delaware Application June 7, 1934, Serial No. 729,397

9 Claims.  (Cl. 122—459)

This invention relates to a process and apparatus for removing solids and entrained liquids from a vapor generated from a parent liquid and particularly to a method of removing solids and entrained liquids from the steam generated in a tube boiler and an apparatus for attaining this end. Hereinafter the invention will be exemplified in the purification of steam, but, as the general statement of invention indicates, my discovery is not to be restricted to this illustrative embodiment.

The need for purification of dry steam has developed from the introduction of high pressure steam generators producing highly superheated steam. It is self-evident that the volume of water required by these generators is so large as to preclude the use of costly distilled water. Consequently it is necessary to use ordinary water which, as known, is generally contaminated with suspended solid matter and/or dissolved salts. It has been found that the presence of even minute quantities of such solids in the steam is sufficient to cause serious scale formations in superheaters, turbines, and the like, resulting in loss of efficiency and eventual plugging, if not more serious damage. This necessitates frequent shut downs, more or less expensive scale removing operations, depending on the type of scale formed, and often causes rapid deterioration of expensive equipment. This is especially true of industrial plants where it is necessary to carry high boiler concentration in order that the blowdown will not be excessive, since in such a plant the greatest amount of the steam produced is not returned to the boiler as condensate and, therefore, the percentage of make up water is large.

Many arrangements have been suggested for reducing this carry over content of the steam. For the most part such means consist of baffle plate arrangements constructed in the steam and water drum near the entrance to the dry tubes or perforated collection pipes leading to the dry tubes. Other arrangements contemplate the use of chains suspended within the steam and water drum and still others employ "purifiers" consisting of separate outside installations constructed between the steam and water drum outlets and the superheater. All of these devices effect some reduction in the carry over but the percentage of solids remaining in the steam when it reaches the superheaters and other equipment is still objectionable.

The purpose of this invention is to reduce the amount of solids that would normally be carried over with the steam to a minimum, far below that obtainable with any of the arrangements now in use. This is accomplished by scrubbing the solids from the steam and simultaneously replacing the water normally carried with the steam from the steam and water drum, which has the same solids concentration as the water in the said drum, with feed water of a much lower solids concentration and then removing as much as possible of the entrained feed water with multiple baffle arrangements. The feed water which eludes the baffles and passes out of the boiler with the steam is so small in quantity and of such low solids concentration that it will cause very little trouble in the superheaters, turbines, and the like, and in any case contains but a small fraction of the solids that would normally be entrained with the steam.

Since the fluid in the steam and water drum of a boiler is at a higher concentration than it is at any other point in a steam generating unit it is most effective to remove the continuous blowdown water from this drum, as by so doing the largest amount of solids can be removed with the least amount of water. If feed water is introduced directly into the steam and water drum for washing the steam or for any other purpose, the concentration in that drum is reduced and the efficiency of the continuous blowdown in removing solids decreased.

Another purpose of this invention, therefore, is to allow the feed water to be introduced into the steam and water drum for the purpose of washing the steam while preventing the feed water from mixing with and diluting the concentrated boiler water. This is accomplished by conveying the feed water to the down-comer tubes through separate ducts. The arrangement is such, however, that the down-comer tubes are not blocked from their regular circulation and the feed water entering them can be completely shut off without danger of their being overheated. The feed water lines are so arranged that feeding may be effected at the normal feed point in the lower or mud drum or through the scrubber in the steam and water drum exclusively, or can be arranged to feed partly into both points and the portion of it going to the scrubber may be automatically varied as the amount of steam generated varies thus insuring sufficient water for thoroughly scrubbing the steam.

In order to attain the above objects I employ an apparatus which includes the following essential component elements:

(a) A scrubber, in which the steam is intimately mixed with a portion of the feed water;

(b) Baffles which remove the entrained water after scrubbing;

(c) Header pipes and nozzles for removing feed water, introduced into the scrubber, from the drum without diluting the concentrated water in that drum;

(d) The proper arrangement of feed water lines for automatically apportioning, according to the steam produced, the amount of feed water sent to the scrubber.

These elements will be described in detail below with reference to the appended drawings in which—

Fig. 1 is a longitudinal cross section of a steam and water drum.

Fig. 2 is a cross section along line 2—2 of Fig. 1.

Fig. 3 is a sectional plan along line 3—3 of Fig. 4.

Fig. 4 is an elevation of ½ of the washer assembly to the right of line A—A' of Fig. 1.

Figure 5:
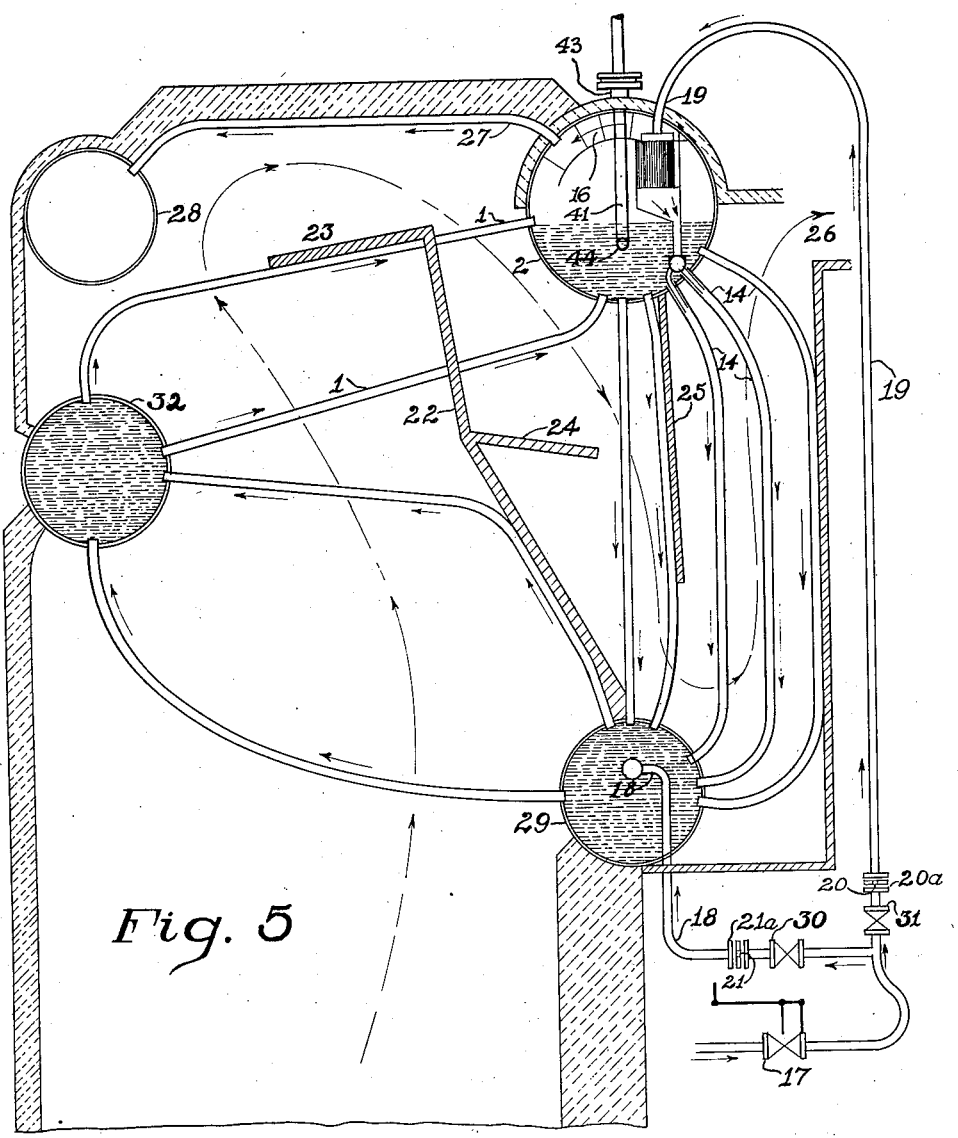
Fig. 5 is an assembly of feed water distribution lines.

The drawings show the application of this invention to a Badenhausen three drum and dry drum boiler, but it can be equally well applied to other types of boilers.

Similar reference characters denote similar parts throughout the various views.

The character 1 indicates a plurality of sets of boiler tubes extending from the water drum 32 to the steam and water drum 2, said sets of tubes entering the drum 2 at various levels around the periphery thereof. Mounted in the drum 2 is a longitudinally extending casing 4 having a central aperture 3 in the floor 4a thereof and an additional centrally located aperture 3a in the rear wall 4b, both apertures operating to permit entrance of steam into the casing from the drum 2. Those portions of the casing walls defining the openings 3 and 3a are provided with reenforcing beads 40 and 40a. An angle member 5 integral with the wall of the drum 2 and positioned on the wall so as to be adjacent openings 3 and 3a prohibits splashing and surging of fluid off the walls of the drum 2.

The casing 4 houses, on each side of openings 3 and 3a, a scrubber 8 comprising a set of vertically arranged longitudinally extending corrugated plates 8a which are set closely together to provide a plurality of tortuous passages 9 having a large surface of contact for the steam in its travel through the casing away from openings 3 and 3a during the scrubbing operation. These plates terminate short of openings 3 and 3a in the floor and rear wall of the casing 4 for a purpose to be presently described.

The washing of the steam in each end of the casing 4 is brought about by feed water which is conveyed to the casing 4 by a header 19 and spray heads 7. Each spray head 7 has a slit 6 arranged in the head above and between those portions of the casing floor and rear wall limited by the openings 3 and 3a respectively and the inner ends of the plates 8a. By means of each head 7 a continuous current of water is sprayed into an end of the casing 4 forming a curtain at a slight distance inwardly from the entrance point of the steam into that end of the casing. This construction causes a thorough intermingling of the steam and scrubbing water which is augmented during the travel of the mixture through the passages 9.

It has been previously emphasized that the efficiency of the blow-down depends upon the concentration of the solids contained in the liquid in drum 2. Hence it is essential that the feed water entering casing 4 through spray heads 7 should not be permitted access to the liquid in drum 2, since it would cause a dilution of this fluid and a decrease in the efficiency of the blow-down which is removed through blow down pipe 41 having openings 42 in the manifold 44 thereof. The nozzle 43 is provided to conduct the blow-down pipe out of the drum. Access of the scrubbing water to the liquid of drum 2 is, therefore, effectively prevented by the construction outlined above.

Thus it will be noted that due to the location of the spray heads with repect to the imperforate portions of floor 4a and wall 4b the injected water tends to fall inwardly from the opening 3. Any possibility of the injected water running into opening 3 is, moreover, obviated by the velocity of sweep of the steam inwardly from openings 3 and 3a which causes the curtains of falling water to assume a direction of motion away from said openings as shown quite aptly in Figs. 1 and 4.

As depicted by Figs. 1 and 4, the casing 4 at each end merges into a vertical duct 13 which receives the water and steam from the casing 4. The floor 4a of the casing adjacent its juncture with the duct 13 is given a downward slope to provide a drainwall 10 leading into the duct. Said drainwall 10 provides support for a plurality of rows of vertically arranged angle plates 11 located with the angles thereof opening toward the outlets from the tortuous passages 9. The rows of said angle plates are staggered with respect to each other as shown in Fig. 3. These plates act to baffle the mixture of steam and water exiting from the passages 9. Due to the slope of wall 10, the plates 11 only contact said wall at the outer extremities of the V's thereof so that openings are provided between the ends of the plates and wall 10 to allow the water running down the angle plates unobstructed passage on the slope of wall 10.

The duct 13 extends downwardly into a header 12 which is provided with a plurality of outlet tubes 15. These tubes project a short distance into adjacent downcomer boiler tubes 14 which connect the steam and water drum 2 with the mud drum 29. Said tubes 15 are of a materially smaller diameter than tubes 14 so that a flow passage is formed between the walls of said tubes. By virtue of the above arrangement the scrubbing water passing into duct 13 from casing 4 is not permitted to intermingle with and dilute the water in drum 2.

The duct 13 at its upper end leads into a steam header 16 which opens into the top of casing 4. The steam, scrubbed, purified, and separated from entrained wash water in casing 4, passes from duct 13 into header 16 from which it is drawn off through a plurality of steam tubes 27 into dry drum 28.

18 represents a pipe leading to the regular feed point in the drum 29, while 19, as previously stated, indicates a header for feeding water into the casing 4. A feed water regulating valve 17 controls the total quantity of feed water entering the boiler through the system, while orifices 20 and 21 in lines 19 and 18 respectively apportion the feed water between the drum 29 and the casing 4 in drum 2. These orifices 20 and 21 are circular holes concentric with the center line of the respective pipes and constructed in thin plates installed between flanges 20a and 21a. Reference numerals 30 and 31 indicate stop valves for cutting off the water supply to lines 18 and 19.

The usual baffles 22, 23, 24 and 25, direct the course of the products of combustion from a heating source (not shown) around the boiler tubes and direct the products of combustion to the stack opening 26.

In operation, the above combination or arrangement of the elements effects the following process:

A mixture of steam and water enters the steam and water drum 2 from the tubes 1 partly above and partly below the water level. The steam with entrained moisture and solids then enters the casing 4 through the openings 3 and 3a. After passing through these openings, the steam is divided into two equal and opposite streams, each stream passing through a curtain of wash or feed water uniformly distributed across the entire passage. The steam carrying the feed water with it passes into the scrubber 8 and between the rows of corrugated plates 8a. The feed water is carried along the surface of the corrugated plates by the velocity of the steam and down the plates by gravity thus taking an angling path through the scrubber 8. The steam thus is caused to give up its concentrated moisture and dust to the feed water and in turn entrains some fresh feed water of low solids concentration.

The feed water entrained with the steam is then partly removed by passing the steam through and against the staggered rows of vertical angles 11, the staggering causing the steam passing between two angles of one row to be directed into the centers of the angles in the next row. The steam in passing through and against these angle baffles has its direction changed repeatedly while the heavier particles of water tend to continue in a straight path, thereby impinging on the surface of the angles and running down by gravity to the drain plate 10 and then into the header 12 by way of duct 13.

The steam leaving the angle baffles enters the relatively large duct 13 where its velocity is so reduced that any large particles of wash water still entrained fall out by gravity into the header 12 along with the feed water draining from the sloping drain plate 10. The feed water collected in the header 12 is then evenly distributed to several down-comer tubes 14 through nozzles 15. As the velocity of the water in the downcomer tubes is always greater than that of the water issuing from the nozzles 15, there is no possibility of the low concentrated feed water backing into the drum and diluting the concentrated water thereby to impair the efficiency of the continuous blowdown. Since the nozzles 15 are relatively small they do not block the normal flow in the downcomer tubes 14. Therefore, the feed water to the washer can be completely shut off without damaging the downcomers by overheating as would occur if there were no circulation through them.

The steam after the separation of the water therefrom passes up from the duct 13 into the header 16 from which it can be passed through additional baffling of any conventional type, best fitted for the space available before passing to the dry drum or superheater 28, as clean steam.

The feed water enters the lines through the feed water regulating valve 17, divides and is carried by the pipe 18 to the regular feed point in the lower mud drum and by the header 19 to the scrubber in the steam and water drum. Due to the provision of flow meter orifices 20 and 21 in lines 19 and 18, the proportion of feed water entering the scrubbers through the line 19 is automatically adjusted to compensate for variations in steam production, so that there is always sufficient scrubbing water available to wash the steam produced during any period of operation. At low rates of steam production, proportioning of the feed water is so controlled that all or a greater proportion of the feed water enters the system at the regular feed point in the lower drum through the line 18; conversely at high rates of steam production the control is such that the feed water may be supplied largely through the scrubber in the steam and water drum. To effect this control the opening in the orifice to the scrubber is made the correct amount larger than the orifice to the regular feed point. Since the resistance to flow in any line is approximately equal to the square of the velocity in that line, and since the resistance in both lines 18 and 19 must be equal as they come from a common source and discharge against the same pressure, and since the principal resistances in both lines are the orifices, the feed water passing through line 19 having orifice 20 will increase much faster than that passing through the line 18 having orifice 21 as the total quantity of feed water is increased to provide for an increase in steam production. Thus, even though the orifice 21 is smaller than orifice 20, no water will flow through line 19 in which orifice 20 is located until the loss in head due to the resistance of orifice 21 and line 18 is equal to or exceeds the difference in head between the discharge point 6 and the liquid level in the drum 2. The proportion of feed water passing to either of the two feed points can be arranged by properly choosing the ratio of the orifice diameters.

As an example of the relative proportion of feed water between the two inlet points for various loads, the following data is given: Assuming that both pipe lines 18 and 19 are 2½ inches S. P. S. having equivalent resistances equal to 100 feet of straight pipe, that the difference in level between the point of discharge 6 and the liquid level in drum 2 is 1.6 feet, and that orifice 20 is 1.4 inches in diameter, and orifice 21 is 1 inch in diameter, both being sharp-edged and having a coefficient of approximately 0.61, it will be found that up to approximately 15,000 lbs. per hour all the feed water will go to the lower drum as the loss in head through line 18 is less than 1.6 feet, the difference in head between the discharge point 6 and the liquid level in drum 2. Above 15,000 lbs. per hour, some of the water will go through the upper line 19 since the loss in head in the lower line 18 will be more than 1.6 feet. Upon reaching a rate of 65,000 lbs. per hour, approximately 26,000 lbs. per hour will go through line 18 and approximately 39,000 lbs. per hour will go through line 19.

It is to be readily observed that the application of this invention is general in nature and is not confined to the washing of steam issuing from a steam boiler. Thus, the process and apparatus particularly described above is but illustrative of the invention and can be modified and adapted to any situation where it is necessary to remove entrained solids or concentrated liquids from a vapor or gas, for instance, in the removal of dyestuff particles or dust from air or other gases, without departing from the spirit or scope of the invention.

Having now particularly described my invention what I claim is:

1. A process for the treatment of steam generated in a steam generating system wherein the blow off is effected from a steam and water drum which comprises introducing feed water at two different points in the boiler or generating system, said points being so selected that a part of the feed water may be utilized for washing steam at one of these points, the feed water used for such washing being so introduced as to form a curtain of water, these points of introduction being also so selected as to prevent any feed water from entering the body of water from which the blow off is effected, automatically apportioning the feed water between these feed points in such a way that that portion of the total amount of feed water which is supplied for steam-washing purposes increases as the rate of steam production increases, passing the steam through said curtain of feed water thereby substituting water of low solids concentration for the water carry-over in the steam, flowing the steam and feed water concurrently over a tortuous path, separating the steam and feed water, directing the flow of feed water to the generating system, and directing the flow of purified steam out of the system.

2. In a process for the treatment of steam from the steam and water drum of a water tube boiler wherein the blow off is effected from the said steam and water drum, the step which comprises introducing feed water simultaneously at the regular feed point in the lower or mud drum and also at a point in a steam washing unit mounted in the steam and water drum in such a manner as to prevent the fresh feed water, entering at the latter point, from coming into contact with the main body of water in the steam and water drum, thereby maintaining the efficiency of the blow-off from that drum.

3. In a process for the treatment of steam from the steam and water drum of a water tube boiler wherein the blow off is effected from the said steam and water drum wherein the feed water is introduced simultaneously at the regular feed point in the lower or mud drum and also at a point in a steam-washing unit mounted in the steam and water drum in such a manner as to prevent the fresh feed water, entering the latter point, from coming into contact with the main body of water in the steam and water drum, thereby maintaining the efficiency of the blow-off from that drum, the step which comprises automatically apportioning the feed water between the regular feed point in the lower or mud drum and the point in said steam washing unit in such a way that that portion of the total feed water which is supplied for steam-washing purposes increases as the rate of steam production increases.

4. In a process for the treatment of steam generated in the steam and water drum of a water tube boiler system wherein the blow off is effected from the said steam and water drum, the steps which comprise passing steam containing entrained water through a curtain of feed water prior to its exit from the said steam and water drum and in such a manner as to prevent the feed water from mixing with the more concentrated water in the steam and water drum, flowing the steam and feed water concurrently over a tortuous path, separating the steam and feed water, directing the flow of feed water out of the steam and water drum in such a manner that it does not mix with and dilute the more concentrated water therein, and directing the purified steam out of the system.

5. In a steam boiler of the water tube multi-drum type a steam washing arrangement which comprises an enclosure mounted in the steam and water drum the inlet to said enclosure being so constructed and arranged as to prevent the entrance of slugs of water, pipes for the introduction of feed water to the enclosure, means associated with said pipes for the introduction of feed water at the regular feed point in the mud drum, means for automatically increasing the proportion of feed water entering the above enclosure with an increased steam production, a scrubber within the enclosure so arranged as to bring steam passing through into intimate contact with feed water and so arranged as to act as a steam separator when no feed water is being introduced, means for separating steam and water, means for carrying the feed water directly into the down-comer tubes of the boiler without mixing it with the concentrated water in the steam and water drum, means for blowing off the water from said steam and water drum, and means for directing the passage of purified steam out of the steam and water drum.

6. In a steam boiler of the water tube multi-drum type a steam washer which comprises an enclosure in the steam space of the steam and water drum the inlet of which is so constructed and arranged as to prevent the entrance of slugs of water, means for introducing feed water to the enclosure in such a manner that it does not enter the water space of the drum, a scrubber within the enclosure, baffle means for separating steam and water, ducts for directing the flow of separated steam and water, means for leading the separated water into the downcomer tubes of the steam and water drum in such a manner as to prevent the separated water from mixing with the more concentrated water in the steam and water drum, and means for blowing off the concentrated water of the steam and water drum.

7. In a steam boiler of the water tube multi-drum type an enclosure in the steam space of the steam and water drum for directing the flow of steam, distribution pipes having slot like orifices opening into the enclosure for the introduction of feed water thereto, rows of vertically disposed corrugated plates constituting a scrubber, angle members so arranged as to change the direction of flow of steam passing through, catch the entrained water and conduct it away from the path of the steam, means for directing the flow of feed water from the scrubber and separators directly to the down-take boiler tubes so as to prevent the feed water from mixing with the more concentrated water in the steam and water drum, ducts for carrying off the purified steam, and means for blowing off the concentrated water of the steam and water drum.

8. In a steam boiler of the water tube multi-drum type in the water space of the steam and water drum, a receptacle for directing the flow of feed water into the downcomer tubes in such a way as not to interfere with the normal circulation in the downcomer tubes when no feed water is passing into them and in such a way that said feed water does not mix with and dilute the concentrated water in the steam and water drum, means for supplying feed water to the said receptacle when required, and means for blowing off the concentrated water of the steam and water drum.

9. In a steam boiler of the water tube multi-drum type, means for supplying feed water at two different points, one being the regular feed point in the lower or mud drum and the other supplying feed water to a steam washer constructed entirely within the steam space of the upper or steam and water drum, and means for automatically increasing the proportion of feed water entering the steam washer to an increased steam production, thereby supplying the additional water necessary to wash the steam normally containing a higher percentage of carry-over at higher rates of steam production.

HERMAN P. ANGERMUELLER.